Patented May 15, 1945

2,376,054

UNITED STATES PATENT OFFICE 2,376,054

PREPARATION OF AMINO ALCOHOLS

Vernon E. Haury, El Cerrito, Calif., assignor to Shell Development Company, San Francisco, Calif., a corporation of Delaware No Drawing. Application February 13, 1943, Serial No. 475,843

10 Claims. (Cl. 260—584)

This invention relates to the preparation of amino alcohols and more particularly to a process for preparing amino alcohols from alpha-beta unsaturated ketones, i. e., unsaturated ketones in which the carbon atoms linked by the double bond are in alpha-beta relation to the carbon atom of the carbonyl group. In one of its embodiments the invention provides a practical and economical method for effecting the conversion of mesityl oxide to diacetone alkamine (2-amino-2-methyl-pentanol-4).

Amino alcohols when treated with fatty acids such as stearic and oleic acids give salts which are excellent capillary-active agents possessing valuable wetting, foaming, emulsifying and related properties. These salts are superior in many respects to products now prepared from the hydroxy alkylamines such as the ethanolamines.

Processes heretofore disclosed for preparing amino alcohols from alpha-beta unsaturated ketones are not adapted for commercial scale operation, being disadvantageous chiefly because of their complexity, the high cost of the reagents involved, and the low yields which they provide. The process of the present invention, on the other hand, requires only readily available and inexpensive reagents and it is easily and cheaply carried out to give a high yield of the desired product.

The process of the invention is executed by treating an alpha-beta unsaturated ketone with ammonia under conditions providing for the conversion of at least a substantial portion thereof to an amino ketone, and catalytically hydrogenating the amino ketone to the desired amino alcohol, either in the presence or absence of any unreacted or by-product material from the ammonia treatment.

The unsaturated carbonyl compounds employed as starting materials in the execution of the present process may be prepared by any appropriate method. An alpha-beta unsaturated ketone suitable for treatment may be prepared, for example, through the dehydration of the condensation product produced by condensing a saturated ketone either with itself or with another saturated ketone or with a saturated aldehyde. Thus, the dehydration of diacetone alcohol which may be formed through the condensation of two molecules of acetone yields mesityl oxide; homo mesityl oxide is produced by dehydrating the condensation product of two molecules of methyl ethyl ketone; 3-methyl-butene-2-one-4 is obtained by dehydrating 2-hydroxy-3-methyl-4-butanone prepared by condensing acetaldehyde and propionaldehyde; 3-methyl-pentene-2-one-4 is obtained by dehydrating 2-hydroxy-3-methyl-4-pentanone prepared by condensing acetaldehyde and methyl ethyl ketone, etc.

The dehydration of condensation products such as are typified by those mentioned above may be accomplished by any appropriate procedure as through the use of strong bases or suitable mineral oxy acids as phosphoric and sulfuric acids. If desired, the intercondensation reaction and dehydration may be carried out simultaneously.

Among the many amino alcohols which may be prepared according to the process of the invention may be mentioned: diacetone alkamine, 3-amino-3,4-dimethyl-5-hexanol and/or 3-amino-3-methyl-5-heptanol, 2-amino-2,3-dimethyl-4-pentanol and/or 2-amino-2-methyl-4-hexanol, and 2-amino-3-methyl-4-pentanol. These are produced through the treatment respectively of: mesityl oxide, homo mesityl oxide, the 7-carbon-atom unsaturated ketones resulting from the dehydration of the condensation product of acetone and methyl ethyl ketone, and 3-methyl-pentene-2-one-4.

The treatment of an alpha-beta unsaturated ketone with ammonia which constitutes the first step of the present process may be carried out with either aqueous or anhydrous ammonia. In most cases the yield of amino ketone is substantially the same irrespective of whether aqueous or anhydrous ammonia is employed. Although the unsaturated ketone need not be of highest purity, it has been found that the formation of "heavy ends," i. e., products of a higher boiling point than the desired amino ketone, is materially reduced through the use of freshly prepared material. In general, inferior results are obtained with material which has been stored for a period sufficient to produce discoloration.

Whether conducted with aqueous or anhydrous ammonia, the initial step of the present process is preferably carried out at a temperature which does not substantially exceed 100° C., temperatures within the range of from about 30° C to about 90° C. being especially suitable. It has been determined that operation at temperatures below 100° C., like the use of freshly prepared material, materially aids in reducing the amount of by-products formed.

In the practice of the invention or more particularly the first step thereof the ratio or relative amounts of the reactants may vary within wide limits. In general, however, it is preferred to operate using from about one to two mols of ammonia for each mol of alpha-beta unsaturated ketone being treated. When operating with aqueous ammonia, excellent yields of the desired amino ketone have been derived from reaction mixtures which contained 1½ mols of water for each mol of ammonia. Also, good yields have been achieved where the reaction mixture contained about ⅓ mol of water for each mol of ammonia.

The initial step of the process of the invention may be executed in any suitable type of apparatus, for example, a heated autoclave equipped with suitable stirring means.

Subsequent to the treatment with ammonia the amino ketone is usually separated from the other components of the reaction mixture prior to its hydrogenation, but it is to be understood that the hydrogenation may be carried out in the presence of one or more of these components.

Separation of the amino ketone is usually effected by first distilling off the unreacted portion of the alpha-beta unsaturated ketone, which constituted the starting material, together with any unreacted ammonia and any water which may be present and then recovering the amino ketone product from the residual mixture by a distillation under reduced pressure.

The catalytic hydrogenation of the amino ketone to the corresponding amino alcohol may comprise the use of any hydrogenation catalyst applicable to the low temperature hydrogenation of aldehydes and/or ketones to alcohols. These are generally characterized as "mild hydrogenation catalysts" and may contain, for example, copper, zinc oxide, chromium oxide, manganese oxide, etc. Also the noble metal catalysts such as platinum and palladium and their oxides are so characterized.

Pyrophoric nickel metal catalysts are also applicable in the execution of the hydrogenation step of the present process; in fact, for many operations and particularly in the hydrogenation of diacetone amine, which is produced according to the invention by treatment of mesityl oxide with ammonia, to diacetone alkamine, the use of a pyrophoric nickel metal catalyst, as Raney nickel, is preferred.

The hydrogenation is most suitably carried out in liquid phase under considerable pressure, e. g., from about 250 to about 2,000 pounds per square inch. Any suitable type of reactor as a shaken or stirred autoclave may be employed for the hydrogenation. The catalyst in the desired amount may be added before, during, or after the introduction of the material to be hydrogenated, the preferred amount of catalyst in most cases being equal to about two to about twenty percent by weight of the treated material. When operating in a continuous manner with an unsupported catalyst, loss of catalyst with the outgoing reacted mixture may be avoided by employing in addition to a filter a suitable filter aid as a diatomaceous earth.

The hydrogenation may be conducted at temperatures ranging from room temperature (about 20° C.) to about 250° C. The temperatures within the range of from about 50° C. to about 180° C. have been found especially appropriate. The reactor is preferably equipped with both heating and cooling means for accurate temperature control.

Substantially pure hydrogen from any source may be used or it is possible to use hydrogen-containing gases as purified coke oven gas, cracked oil gas, and the like, as well as gases obtained in the dissociation of ammonia, the dehydrogenation of alcohols, etc. The presence of substantially inert materials as nitrogen, paraffin hydrocarbons, e. g., methane, and the like in the gas employed, is not detrimental. In addition to the economies realized in the use of such by-product gases the presence of the inert material may be advantageous as an aid in temperature control. It is to be understood that substances such as organic halides, sulfur and sulfur compounds in amounts sufficient to deleteriously affect the life and activity of the catalyst should not be present. Also, when a pyrophoric metal catalyst is used, it is desirable to avoid its exposure to air as much as possible.

In general, it is preferred to conduct the hydrogenation without the use of diluents such as alcohols since it has been found that in most cases the yield of the desired amino alcohol is not improved by such procedure.

Separation of the amino alcohol product from the reacted mixture upon completion of the hydrogenation is accomplished subsequent to the removal of any hydrogenation catalyst which may be present as by decantation, centrifugation, filtration, etc., by any appropriate method such as, for example, fractionation, solvent extraction, adsorption, extractive distillation, and chemical means. The exact procedure followed in any individual case is naturally dependent upon the nature and respective amounts of the components of the reacted mixture, the relation of their boiling points, etc. Any unreacted material may be rerun or recycled if desired.

Although the present process is broadly applicable to the conversion of alpha-beta unsaturated ketones to amino alcohols, it is particularly valuable as a means of preparing diacetone alkamine (2-amino-2-methyl-pentanol-4) from mesityl oxide. The salts of diacetone alkamine and suitably fatty acids such as stearic and oleic acids are of great utility for aqueous treatments of all kinds and in particular in the wetting, cleansing, sizing, de-electrification, creping and other treatments of textile filaments, threads, yarns, fabrics and the like and also in the dispersion, emulsification and wetting of difficultly wettable or water-insoluble substances. The dispersions and emulsions so produced are especially adapted for the dyeing or other treatments of textile materials.

Fatty acids in addition to stearic and oleic acids which may be employed to produce the salts of diacetone alkamines having the above-indicated desirable properties include: caprylic, nonylic, capric, undecylic, lauric, tridecoic, myristic, pentadecoic, palmitic, margaric, nondecoic, arachidic, henecosoic, behenic, tricosoic, lignoceric, pentacosoic, cerotic, carbocenic, octacosoic, montanic, melissic, myricinic, psyllaic, psyllostearic, and the like. Those fatty acids which contain a minimum of twelve carbon atoms constitute a preferred group, those containing from sixteen to twenty or more carbon atoms being particularly effective.

The discovery that diacetone amine produced, for example, according to the initial step of the present process, can be catalytically hydrogenated to diacetone alkamine is surprising in view of representations to be found in the literature to the effect that it is necessary to convert the diacetone amine to the relatively more stable acetyldiacetone amine prior to hydrogenation. Under this procedure the desired diacetone alkamine is obtained by the hydrolysis of the acetylated amino alcohol resulting from the hydrogenation of the acetyl-diacetone amine. The present process is advantageous in that the two steps of acetylation and hydrolysis are avoided.

As in other cases the process of the invention as applied to the conversion of mesityl oxide to diacetonealkamine may be carried out by subjecting the entire reaction mixture resulting from the treatment of the mesityl oxide with ammonia, which mixture may comprise ammonia and water in addition to unreacted mesityl oxide and diacetone amine, to a catalytic hydrogenation. Most preferably, however, the material hydrogenated is free at least of ammonia and water.

The catalytic hydrogenation of the distilled diacetone amine which is preferably conducted, as before stated, using a pyrophoric nickel metal catalyst as Raney nickel, usually yields besides diacetone alkamine, methyl isobutyl ketone, methyl isobutyl carbinol, 4-amino-2-methyl-pentane, and 2,4-diamino-2-methyl-pentane. These are produced in varying amounts depending upon the conditions observed during the hydrogenation.

Separation of the diacetone alkamine from the foregoing listed by-products is usually effected by first subjecting the reacted mixture from the hydrogenation reactor to a steam distillation to separate water-insolubles and the products only slightly soluble in water, namely, the methyl isobutyl ketone, the methyl isobutyl carbinol, and the 4-amino-2-methyl-pentane, recovery of the diacetone alkamine from the residual mixture being thereafter accomplished by straight distillation.

The practice of the invention is illustrated by the following examples:

Example I

A mixture consisting of about 83.5% by weight of mesityl oxide and about 16.5% by weight of anhydrous ammonia was charged to a stirred autoclave. After one hour at about 85° C., during which the pressure dropped from 350 p. s. i. to 180 p. s. i., the reaction mixture was subjected to a distillation under a reduced pressure of about 11 mm. The product distilling at 45 to 49° C. containing about 31% mesityl oxide and about 69% diacetone amine was thereafter introduced into a hydrogenation reactor containing about 2 to 3% by weight of Raney nickel and hydrogenated at a pressure of approximately 1500 p. s. i. and at a temperature which varied between about 80 to about 140° C. for a period of 1½ hours. The yield of diacetone alkamine based on the diacetone amine present in the treated fraction was 70 mol %.

Example II

Diacetone amine was prepared by the use of aqueous ammonia. Using the same autoclave as was employed in the experiment of Example I, a mixture consisting by weight of about 76% mesityl oxide, 10% water and 14% ammonia was reacted at about 60° C. for a period of two hours. During the reaction the initial pressure of 115 p. s. i. dropped to 35 p. s. i. Approximately 70% of the treated mesityl oxide reacted under the stated conditions. The yield of diacetone amine based on the mesityl oxide reacted was 97 mol %. The distilled diacetone amine was hydrogenated to diacetone alkamine under substantially the same conditions as above, a comparable yield of the amino alcohol being obtained.

I claim as my invention:

1. A process which comprises reacting diacetone amine and hydrogen at a superatmospheric pressure and at a temperature of from about 50° C. to about 180° C. in the presence of Raney nickel to produce a reaction mixture containing a substantial amount of diacetone alkamine.

2. A process which comprises reacting diacetone amine and hydrogen in the present of Raney nickel to produce diacetone alkamine.

3. A process for producing diacetone alkamine which comprises reacting diacetone amine and hydrogen in the presence of a pyrophoric nickel metal catalyst.

4. A process which comprises reacting diacetone amine and hydrogen at a pressure of about 250 to about 2000 pounds per square inch and at a temperature of from about 50° C. to about 180° C. in the presence of Raney nickel to produce a reaction mixture containing a substantial amount of diacetone alkamine.

5. A process which comprises reacting diacetone amine and hydrogen at a pressure of about 1500 pounds per square inch and at a temperature of from about 50° C. to about 180° C. in the presence of Raney nickel to produce diacetone alkamine.

6. A process for the production of diacetone alkamine which comprises reacting mesityl oxide with ammonia at a superatmospheric pressure and at a temperature of between about 30° C. and about 90° C., distilling the reaction mixture to obtain a distillate comprising mesityl oxide and diacetone amine, and reacting said distillate with hydrogen at a superatmospheric pressure and at a temperature of from about 50° C. to about 180° C. in the presence of Raney nickel.

7. A process for the production of diacetone alkamine which comprises reacting diacetone amine with hydrogen in the presence of a hydrogenation catalyst at a temperature in the range of from about 50° C. to about 180° C.

8. A process for the production of an aliphatic amino alcohol which comprises reacting an aliphatic amino ketone, wherein the amino group is directly linked to a tertiary carbon atom which is separated from the keto group in the same straight chain by a single intervening carbon atom, with hydrogen in the presence of Raney nickel at a temperature of from about 50° C. to about 180° C.

9. A process for the production of an aliphatic amino alcohol which comprises reacting an aliphatic amino ketone, wherein the amino group is directly linked to a tertiary carbon atom which is separated from the keto group in the same straight chain by a single intervening carbon atom, with hydrogen in the presence of a nickel metal hydogenation catalyst at a temperature of from about 50° C. to about 180° C.

10. A process for the production of an aliphatic amino alcohol which comprises reacting an aliphatic amino ketone, wherein the amino group is directly linked to a tertiary carbon atom which is separated from the keto group in the same straight chain by a single intervening carbon atom, with hydrogen in the presence of a hydrogenation catalyst at a temperature of from about 50° C. to about 180° C.

VERNON E. HAURY.